United States Patent [19]
DiDomizio

[11] Patent Number: 5,270,718
[45] Date of Patent: Dec. 14, 1993

[54] METHOD AND APPARATUS FOR TRACKING TARGETS FROM DIRECT AND MULTIPATH REFLECTED RADAR SIGNALS

[75] Inventor: Richard DiDomizio, Sandy Hook, Conn.

[73] Assignee: Technology Service Corporation, Silver Spring, Md.

[21] Appl. No.: 933,264

[22] Filed: Aug. 21, 1992

[51] Int. Cl.$^5$ .............. G01S 13/44; G01S 13/48; G01S 13/66
[52] U.S. Cl. .............. 342/147; 342/148; 342/149; 342/153; 342/80
[58] Field of Search .............. 342/147, 148, 149, 153, 342/154, 157, 158, 74, 75, 80

[56] References Cited

U.S. PATENT DOCUMENTS

| | | | |
|---|---|---|---|
| 4,005,421 | 1/1977 | Dax | 342/148 |
| 4,012,740 | 3/1977 | Lenneper | 342/428 |
| 4,090,197 | 5/1978 | Cantrell | 342/148 |
| 4,316,191 | 2/1982 | Sawatari et al. | 342/91 |
| 4,319,242 | 3/1982 | Lewis | 342/67 |
| 4,472,718 | 9/1984 | Ohashi et al. | 342/148 |
| 4,595,924 | 6/1986 | Gehman | 342/28 |
| 4,734,702 | 3/1988 | Kaplan | 342/424 |
| 4,796,031 | 1/1989 | Koki | 342/148 |
| 4,837,574 | 6/1989 | Hill | 342/27 |

OTHER PUBLICATIONS

W. B. Gordon, "Improved Three Subaperture Method for Elevation Angle Estimation", IEEE Transactions on Aerospace and Electronic Systems, vol. AES-19, No. 1, Jan. 1983, pp. 114-122.

David K. Barton, "Low-Angle Radar Tracking", *Proceedings of the IEEE*, vol. 62, No. 6, Jun. 1974, pp. 687-704.

Samuel Mark Sherman, "A Dissertation in Electrical Engineering", *Complex Angles in Monopuls Radar*, 1965, Index, Table of Contents, pp. 54-63.

Raymond S. Berkowitz, Samuel M. Sherman, "Information Derivable from Monopulse Radar Measurements of Two Unresolved Targets", *IEEE Transactions on Aerospace and Electrical Systems*, Sep. 1971, pp. 1011-1013.

Peyton Z. Peeples, Jr., L. Goldman, Jr., "Radar Performance on Aerospace with Multipath Using the Complex Angle", *IEEE Transactions On Aerospace and Electrical Systems*, vol. AES-7, No. 1, Jan. 1971, pp. 171-178.

Dean D. Howard, Samuel M. Sherman, Don N. Thompson and James J. Capmbell, "Experimental Results of the Complex Angle Technique for Multipath Correction", *IEEE Transactions on Aerospace and Electrical Systems*, vol. AES-10, No. 6, Nov. 1974, pp. 779-787.

*Primary Examiner*—John B. Sotomayor
*Attorney, Agent, or Firm*—Kirkpatrick & Lockhart

[57] ABSTRACT

A method and apparatus to determine angles $\theta_1$ and $\theta_2$ between paths of two sets of reflected radar waves and a radar boresight utilizes the electrical angles $\beta_1$ or $\beta_2$ and two successive radar target observations. One set of radar waves may travel a path from a target and the second set may travel a multipath from the same target. Alternatively, the two sets of radar waves may follow direct paths from two targets. For coherent radar hardware, signals from two halves of an array are processed through a linear coherent receiver, analog-to-digital converter and processing unit with associated memory. The memory contains a database and program which calculates the electrical angles $\beta_1$ and $\beta_2$ and angles $\theta_1$, and $\theta_2$. For non-coherent radar hardware, mixers, a phase detector and two magnitude detectors are substituted for the linear coherent receiver.

10 Claims, 6 Drawing Sheets

METHOD AND APPARATUS FOR TRACKING TARGETS FROM DIRECT AND MULTIPATH REFLECTED RADAR SIGNALS

BACKGROUND OF THE INVENTION

1. Field of Invention

The invention relates to a method and apparatus for tracking targets from which radar signals are reflected in a direct path and in a multipath to a receiver.

2. Description of the Related Prior Art

Radar has long been used to determine the elevation and distance of objects of interest such as airplanes or missiles. A radar signal is directed toward the object and is reflected back to a receiver. If the reflected radio waves travel in a direct path from the target to the receiver, the determination of the distance and elevation of the target is relatively easy. However, if some of the reflected radar waves travel in a direct path to the receiver and other reflected radar waves are again reflected off a second surface and thus travel a multipath to the receiver serious errors can occur. Multipath problems frequently occur when surface based radar is used to track a low flying object. When such objects are at low angles and especially when the target is within a beamwidth or so of the horizon, the errors are especially acute.

A number of different techniques for overcoming or reducing multipath elevation errors have been proposed or investigated. Some of the solutions involved special antenna configurations which permit a single pulse solution. Others have proposed for amplitude monopulse signal processing of the usually neglected component of the difference signal that is in phase quadrature with the sum signal in addition to the in-phase component that is normally used. For a phase monopulse signal they propose to use the usually neglected amplitude component of the ratio of half-array signals in addition to the phase component that is normally used.

Most of the proposed solutions to the problem are based upon a simple model of specular reflection, which assumes an image target at a well defined position below the actual target. Furthermore, the art has concluded that extremely accurate elevation data (one hundredth beamwidth RMS) cannot be expected on targets within two beamwidths of the surface, although that accuracy is available for azimuth measurements if signal fading can be avoided.

Thus, there is a need for a method and apparatus for low angle radar tracking which overcomes the problem of tracking targets which reflect radar signals which travel in both a direct path and a multipath.

SUMMARY OF THE INVENTION

I provide a method and apparatus for tracking targets which reflect radar signals in both a direct path and a multipath. My method uses a conventional array having a top portion and a bottom portion which receives reflected radar signals from the target. The top portion of the array and the bottom portion of the array produce separate analog signals corresponding to the reflected radar signals which are received. If the target is at a height $h_t$ above the surface, the path followed by the directly reflected radar signals will be at some angle $\theta_1$ above a radar boresight. My method and apparatus enable one to find $\theta_1$ utilizing the electrical angle $\beta_1$ which corresponds to the signals generated by each half of the array. In my method I utilize two successive radar target observations. Then I process the signals according to certain equations to yield values for $\beta_1$. $\theta_1$ can then be determined by:

$$\theta_1 = \sin^{-1}\frac{\lambda\beta_1}{2\pi d}$$

My method and apparatus can be used for both coherent and non coherent phase monopulse radar systems. For the non-coherent phase monopulse systems I utilize mixers, a phase detector and magnitude detectors in addition to the analog-to-digital converter, processing unit and memory required for processing coherent radar signals.

Other objects and advantages of the invention will become apparent from a description of the present preferred embodiments which are shown in the FIGURES.

DESCRIPTION OF THE PREFERRED EMBODIMENTS

Figure 1:
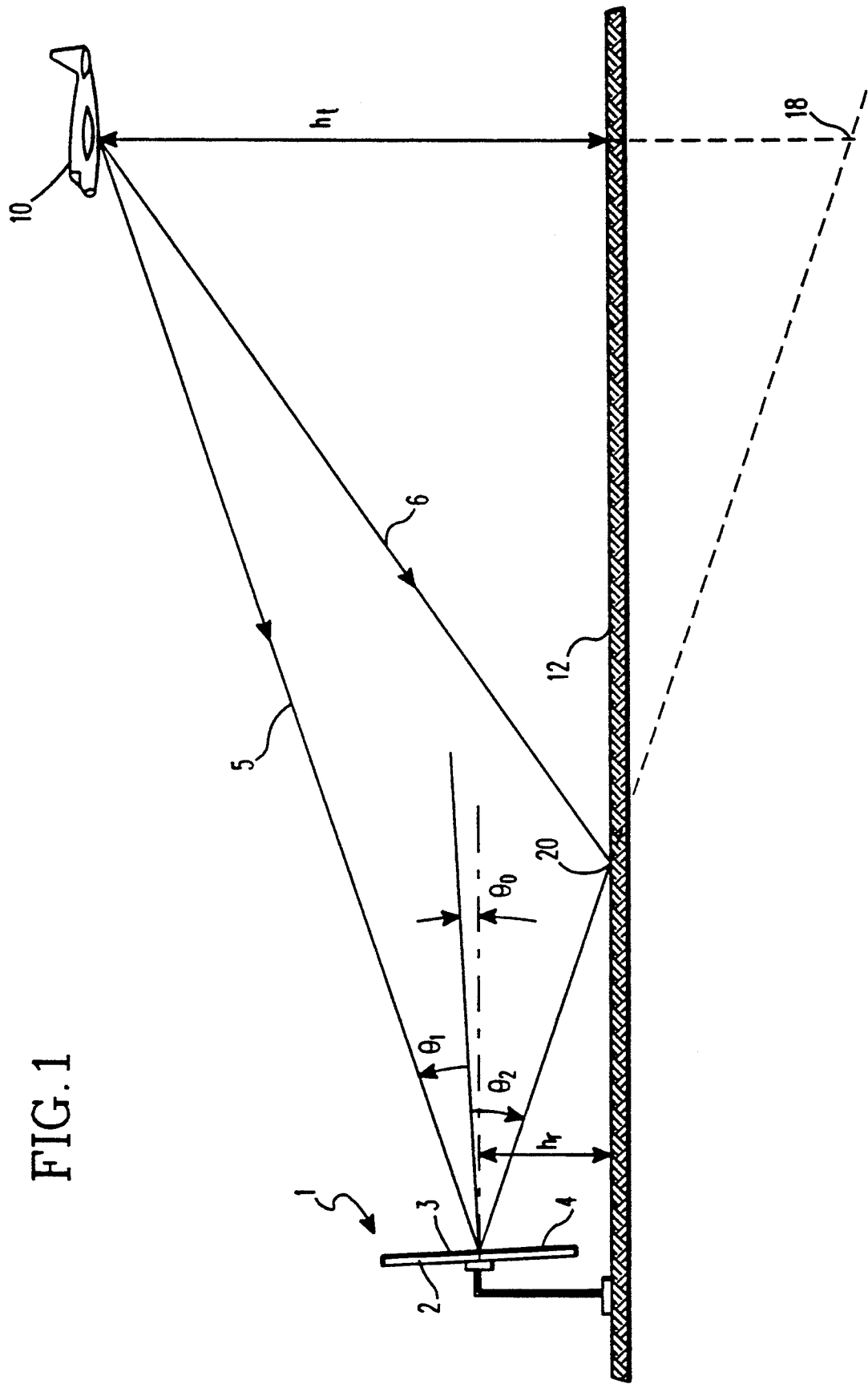
FIG. 1 is a diagram illustrating direct path and multipath of radar signals reflected from a target.

Referring to FIG. 1, a radar receiver 1 comprised of an array 2 having a top portion 3 and bottom portion 4 receives reflected radar signals from target 10. These signals may travel a direct path 5 or a multipath 6 created by reflection of the signal by a reflector such as the surface 12 of a body of water. The signals strike the receiver 1 at some height $h_r$ above the reflector surface 12. The target 10 is at height $h_t$ above surface 12. Direct path 5 is at an angle $\theta_1$ above the radar boresight, which is at an angle $\theta_0$ relative to the horizontal. Reflected path 6 strikes the array at an angle $\theta_2$ below radar boresight. If one wishes to track target 10 or direct a weapon at target 10, angle $\theta_1$ must be known. If $\theta_1$ is known the radar receiver 1 or a weapon (not shown) could be directed toward a path defined by the angle $\theta_1$.

If no multipath signals are received from the target it is relatively easy to find $\theta_1$. Each half 3 and 4 of the array 2 will produce a signal, A and B, respectively when radar signals are received. Each signal will have a known associated electrical angle $\beta_i$.

For a single point target, the ratio of the complex voltages on the upper and lower halves of the monopulse array is given by:

$$\frac{A}{B} = \frac{|A|e^{j\beta_i}}{|B|} \qquad (1)$$

where $\beta_i$, $i=1,2$, is the electrical angle associated with the space angle $\theta_i$. The two angles are related by the interferometer equation:

$$\beta_i = \frac{2\pi d}{\lambda} \sin\theta_i \quad (2)$$

where d is the distance between the array halves and $\lambda$ is the wave-length of the radiation. In Equation 2, the lower array has been selected to be the phase reference, with no loss in generality.

If both a direct path signal and a multipath signal are received from a target it appears to the receiver as if two targets are present, target 10 and a second target at reflection point 20 or intersection 18. By superposition, the phase monopulse response to two unresolved targets is given by:

$$\frac{A}{B} = \frac{e^{j\beta_1} + ae^{j\phi}e^{j\beta_2}}{1 + ae^{j\phi}} \quad (3)$$

where $ae^{j\phi}$ is the ratio of the return from the first target to the return from the second target. Equation 3 implicitly assumes that the far field radiation patterns of the two halves of the array are equal.

The real and the imaginary parts of the complex indicated angle of Equation 3 are given by:

$$x = Re\left\{\frac{A}{B}\right\} = \quad (4)$$

$$\frac{\cos\beta_1 + a^2\cos\beta_2 + 2a\cos[\tfrac{1}{2}(\beta_1 + \beta_2)]\cos[\tfrac{1}{2}(\beta_1 - \beta_2) - \phi]}{1 + 2a\cos\phi + a^2}$$

$$y = Im\left\{\frac{A}{B}\right\} = \quad (5)$$

$$\frac{\sin\beta_1 + a^2\sin\beta_2 + 2a\sin[\tfrac{1}{2}(\beta_1 + \beta_2)]\cos[\tfrac{1}{2}(\beta_1 - \beta_2) - \phi]}{1 + 2a\cos\phi + a^2}$$

Figure 2:
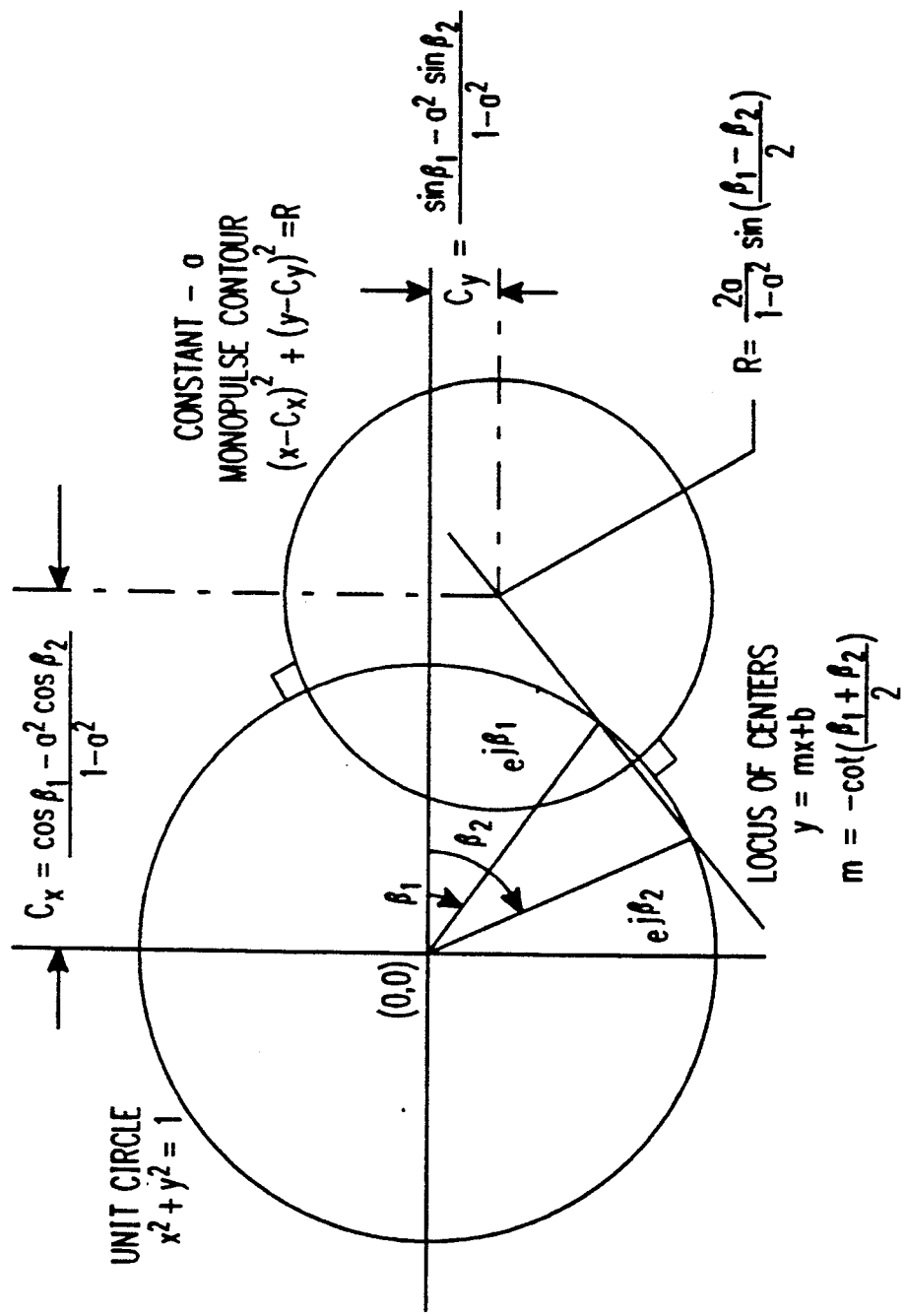
FIG. 2 is a diagram illustrating the relationship of a phase monopulse circle to a unit circle.

The quantities x and y are measured by the radar. On successive looks, the radar measures $(x_1, y_1)$ and $(x_2, y_2)$. These values correspond to points on a phase monopulse circle such as is shown in FIG. 2. For two isotropic point scatterers, or a single isotropic scatterer above a perfectly reflecting surface, the ratio of the signal returns, "a," will not change from look to look, but the phase will change from $\phi_1$ to $\phi_2$. If it is assumed that the time between successive measurements is small, then the space angles, $\theta_1$ and $\theta_2$, of the two targets do not change appreciably and Equations 4 and 5 yield:

$$x_1 = \quad (6)$$

$$\frac{\cos\beta_1 + a^2\cos\beta_2 + 2a\cos[\tfrac{1}{2}(\beta_1 + \beta_2)]\cos[\tfrac{1}{2}(\beta_1 - \beta_2) - \phi_1]}{1 + 2a\cos\phi_1 + a^2}$$

$$y_1 = \quad (7)$$

$$\frac{\sin\beta_1 + a^2\sin\beta_2 + 2a\sin[\tfrac{1}{2}(\beta_1 + \beta_2)]\cos[\tfrac{1}{2}(\beta_1 - \beta_2) - \phi_1]}{1 + 2a\cos\phi_1 + a^2}$$

$$x_2 = \quad (8)$$

$$\frac{\cos\beta_1 + a^2\cos\beta_2 + 2a\cos[\tfrac{1}{2}(\beta_1 + \beta_2)]\cos[\tfrac{1}{2}(\beta_1 - \beta_2) - \phi_2]}{1 + 2a\cos\phi_2 + a^2}$$

$$y_2 = \quad (9)$$

$$\frac{\sin\beta_1 + a^2\sin\beta_2 + 2a\sin[\tfrac{1}{2}(\beta_1 + \beta_2)]\cos[\tfrac{1}{2}(\beta_1 - \beta_2) - \phi_2]}{1 + 2a\cos\phi_2 + a^2}$$

An additional measured quantity, which is independent of $(x_1, y_1)$ and $(x_2, y_2)$ is the square of the ratio of the magnitudes of the signals $B_1$ and $B_2$ received successively on channel-B from half 4 of the array 2. Specifically:

$$\alpha^2 = \frac{|B_2|^2}{|B_1|^2} = \frac{1 + a^2 + 2a\cos\phi_2}{1 + a^2 + 2a\cos\phi_1} \quad (10)$$

Equations 6 to 10 contain all of the information about the two-target environment which a phase monopulse can extract from two successive measurements.

The reason that 5 measured quantities are required is that the two-target problem contains 5 unknowns. The 5 unknowns are the two space angles, $\theta_1$ and $\theta_2$, the amplitude ratio between the two targets, a, and the phase differences between the two targets on successive looks, $\phi_1$ and $\phi_2$. Two looks are required to make the number of independent measurements equal to the number of unknowns.

The explicit complex indicated angle solution allows the 5 equations to be solved for the 5 unknowns, and in particular the 2 unknowns of interest, $\theta_1$ and $\theta_2$. Other researchers have been able to write equations similar to Equations 6 to 10, but only the methods described here yield an explicit solution.

The solution of Equations 6 to 10 is aided by the fact that Equation 3 for the complex indicated angle represents a bilinear transformation of the complex ratio, $ae^{j\phi}$, between the two targets. An important property of the bilinear transform is that it maps circles into circles. In the complex plane, $ae^{j\phi}$, is a circle of radius a, centered at the origin. Thus, the ratio A/B is a circle of radius, R, centered at coordinates $(C_x, C_y)$. By virtue of the properties of the bilinear transform it is possible to show that:

$$C_x = \frac{\cos\beta_1 - a^2\cos\beta_2}{1 - a^2} \quad (11)$$

$$C_y = \frac{\sin\beta_1 - a^2\sin\beta_2}{1 - a^2} \quad (12)$$

$$R = \frac{2a}{1 - a^2} \sin[\tfrac{1}{2}(\beta_1 - \beta_2)] \quad (13)$$

Equations 11 to 13 are not independent because for the transform of Equation 3 it is generally true that:

$$1 + R^2 = C_x^2 + C_y^2 \quad (14)$$

Equation 14 is equivalent to stating that the phase monopulse circle, A/B is orthogonal to the unit circle (at the points of intersection).

An example of a phase monopulse circle and its relation to the unit circle is shown in FIG. 2. For as long as the quantity, a, remains constant all radar measurements of the complex indicated angle $(x_i, y_i)$ fall on the same transformed circle in the complex plane. The monopulse contour is defined by:

$$(x-C_x)^2+(y-C_y)^2=R^2 \quad (15)$$

Thus, for the measured values $(x_1,y_1)$ and $(x_2,y_2)$ $$(x_1-C_x)^2+(y_1-C_y)^2=R^2 \quad (16)$$

$$(x_2-C_x)^2+(y_2-C_y)^2=R^2 \quad (17)$$

Through the use of Equation 14, Equations 16 and 17 can be solved to yield:

$$C_x = \frac{y_2(x_1^2+y_1^2+1) - y_1(x_2^2+y_2^2+1)}{2(x_1y_2 - x_2y_1)} \quad (18)$$

$$C_y = \frac{x_1(x_2^2+y_2^2+1) - x_2(x_1^2+y_1^2+1)}{2(x_1y_2 - x_2y_1)} \quad (19)$$

Equations 18 and 19 allow the coordinates of the center of the transformed circle to be determined from the radar measurements.

From FIG. 2 it is apparent that the point $(C_x,C_y)$ lies on the line that is defined by the unit phasors:

$$e^{j\beta_1} = \cos\beta_1 + j\sin\beta_1 \quad (20)$$

$$e^{j\beta_2} = \cos\beta_2 + j\sin\beta_2 \quad (21)$$

The fact that the three points $(\cos\beta_1, \sin\beta_1)$, $(\cos\beta_2, \sin\beta_2)$, and $(C_x,C_y)$ are colinear can be proved by using simple plane geometry. The slope of the line defined by Equations 20 and 21 is given by:

$$m = \frac{\sin\beta_1 - \sin\beta_2}{\cos\beta_1 - \cos\beta_2} \quad (22)$$

$$m = -\cot[\tfrac{1}{2}(\beta_1 + \beta_2)] \quad (23)$$

$$m = \frac{-1}{\tan[\tfrac{1}{2}(\beta_1 + \beta_2)]} \quad (24)$$

To complete the explicit solution for the 2 target angles it is necessary to relate the slope m to the measured quantities.

Combining Equations 4 and 5, it is possible to write:

$$\tan[\tfrac{1}{2}(\beta_1 + \beta_2)] = \frac{y(1 + 2a\cos\phi + a^2) - \sin\beta_1 - a^2\sin\beta_2}{x(1 + 2a\cos\phi + a^2) - \cos\beta_1 - a^2\cos\beta_2} \quad (25)$$

Rearranging Equation 25 to solve for $\cos\phi$ yields:

$$\cos\phi = \quad (26)$$

$$\frac{m(\sin\beta_1 + a^2\sin\beta_2) + (\cos\beta_1 + a^2\cos\beta_2) - (1 + a^2)(x + my)}{2a(x + my)}$$

Equation 26 can in turn be substituted into Equation 10 to complete the solution. The value for $\cos\phi_1$ that is required in Equation 10 is obtained from Equation 26, with x and y replaced by $x_1$ and $y_1$. Similarly, $\cos\phi_2$ is obtained by replacing x and y with $x_2$ and $y_2$. The net result is that:

$$a^2 = \frac{x_2 + my_2}{x_1 + my_1} \quad (27)$$

Solving for m, it is possible to express the slope in terms of the measured quantities:

$$m = -\frac{a^2 x_1 - x_2}{a^2 y_1 - y_2} \quad (28)$$

Once the value of m is calculated from the radar data, the line defined by the unit phasors can be described in slope-intercept form:

$$y = mx + b \quad (29)$$

where the y-axis intercept, b, is found by substituting in Equation 29 the values of a point on the line, $(C_x,C_y)$.

$$b = C_y - mC_x \quad (30)$$

The required solution for $\theta_1$ and $\theta_2$, or equivalently $\beta_1$ and $\beta_2$, is obtained by solving for the intersection of the line in Equation 29 with the unit circle:

$$x^2 + y^2 = 1 \quad (31)$$

The values of x satisfying the two equations are the roots of the quadratic:

$$(m^2+1)x^2 + 2mbx + (b^2-1) = 0 \quad (32)$$

Calling the two roots, $x_{\beta 1}$ and $x_{\beta 2}$ $$x_{\beta 1,\beta 2} = \frac{-mb}{m^2+1} \pm \frac{\sqrt{m^2b^2 - (m^2+1)(b^2-1)}}{m^2+1} \quad (33)$$

The corresponding y values are given by Equation 29, with the electrical target angles calculated by means of:

$$\beta_{1,2} = \tan^{-1} \frac{y_{\beta 1,\beta 2}}{x_{\beta 1,\beta 2}} \quad (34)$$

In FIG. 1, I show both a direct signal path 5 and multipath 6. However, my method and apparatus will also work for signals from two unresolved targets each of which reflects a signal in a direct path. These signals must obey the same assumption of variable phase but constant amplitude and angle locations between observations.

Figure 3:
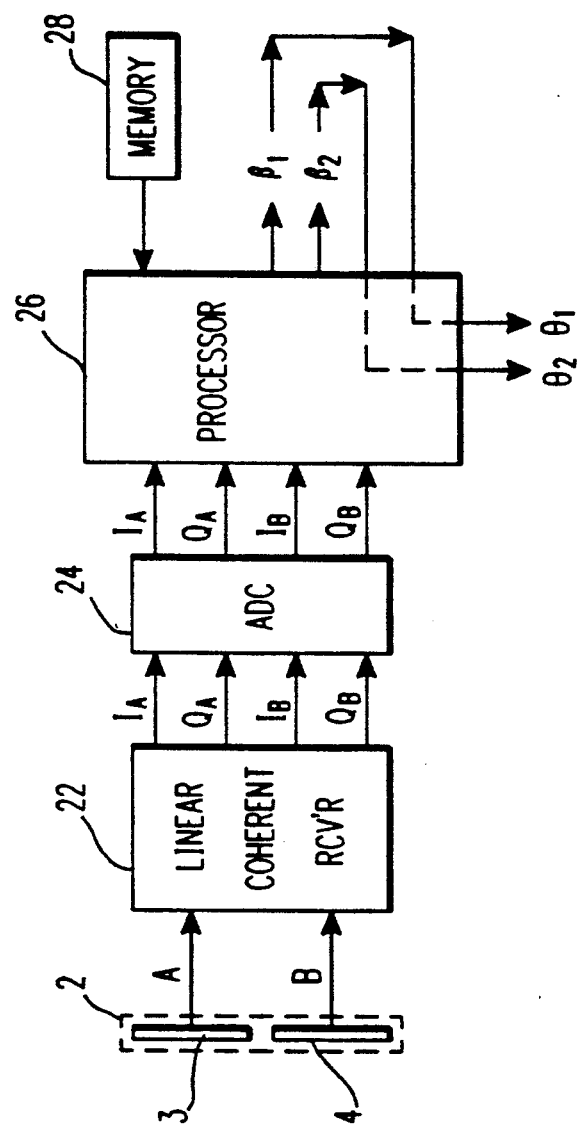
FIG. 3 is a block diagram of a present preferred apparatus for processing direct path and multipath radar signal where there are coherent radar channels.
Figure 4:
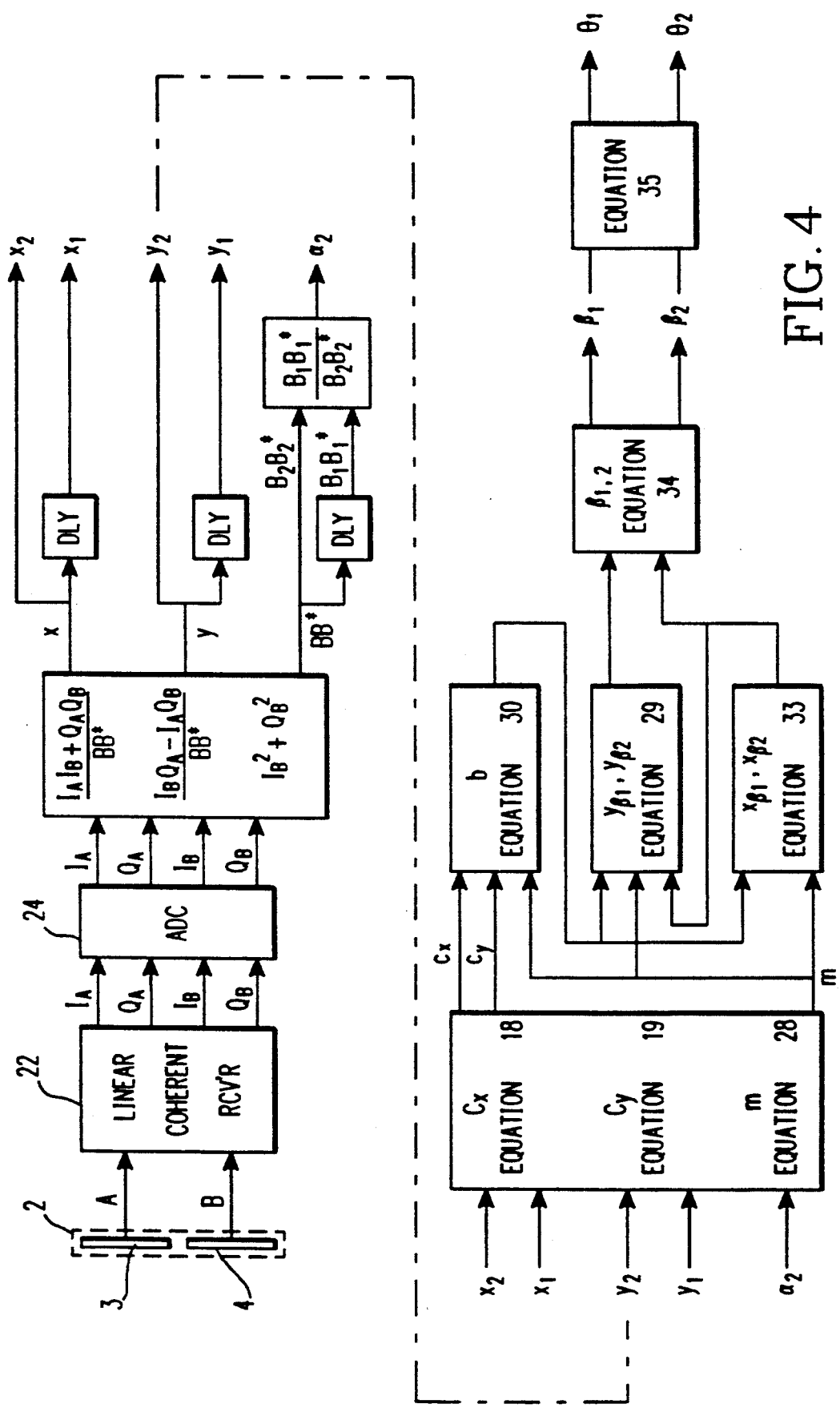
FIG. 4 is a block diagram illustrating the present preferred method for processing radar signals utilizing the coherent radar hardware of FIG. 3.

In FIG. 3, I show a diagram illustrating the basic hardware required to perform my method. In FIG. 4 I show the flow of operations within the processing unit to derive $\beta_1$ and $\beta_2$ and $\theta_1$ and $\theta_2$. Where appropriate, I recite in FIG. 4 the equation or equation number which is desired. The received signals A and B from the upper and lower halves 3 and 4 of the monopulse array 2 are coherently down-converted in linear coherent receiver 22 and digitized by the analog-to-digital converter (ADC) 24. Following directions from a program in memory 28, the signals:

$$A = I_A + jQ_A$$

$$B = I_B + jQ_B$$

are formed into a ratio in a processing unit 26. Then, the real and imaginary parts are calculated:

$$x = Re\left(\frac{A}{B}\right) = \frac{I_A I_B + Q_A Q_B}{BB^*}$$

$$y = Im\left(\frac{A}{B}\right) = \frac{I_B Q_A + I_A Q_B}{BB^*}$$

along with the squared-magnitude of the lower channel:

$$|B|^2 = BB^* = I^2_B + Q^2_B$$

After a delay indicated by box DLY that is equal to the time between radar observations of the target environment, two successive values of x, $x_1$ and $x_2$, and y, $y_1$ and $y_2$, along with $\alpha^2$ are available for processing. As shown in FIG. 4, the 5 measured quantities are processed according to the equations which were discussed above and which are in memory 28 to yield the values for $\beta_1$ and $\beta_2$. The space angles of the two targets, $\theta_1$ and $\theta_2$, are then obtained from the electrical angles by inverting Equation 2.

$$\theta_{1,2} = \sin^{-1}\frac{\lambda\beta_{1,2}}{2\pi d} \quad (35)$$

Figure 5:
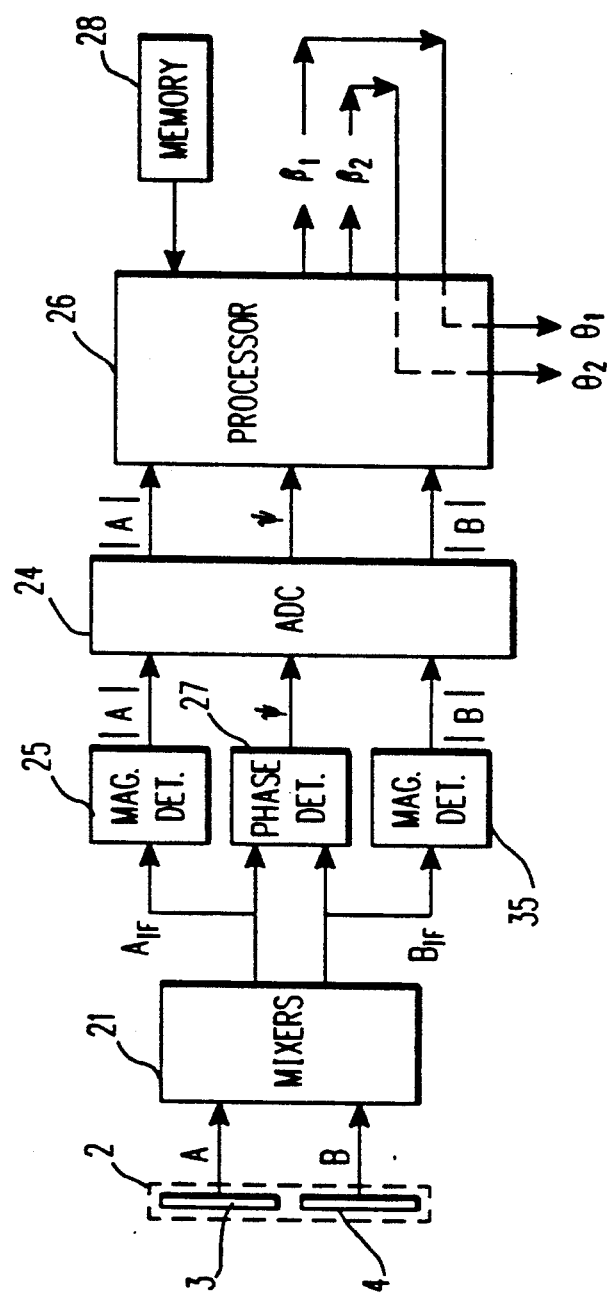
FIG. 5 is a block diagram showing a present preferred hardware for processing direct and multipath reflected signals using a non-coherent radar.
Figure 6:
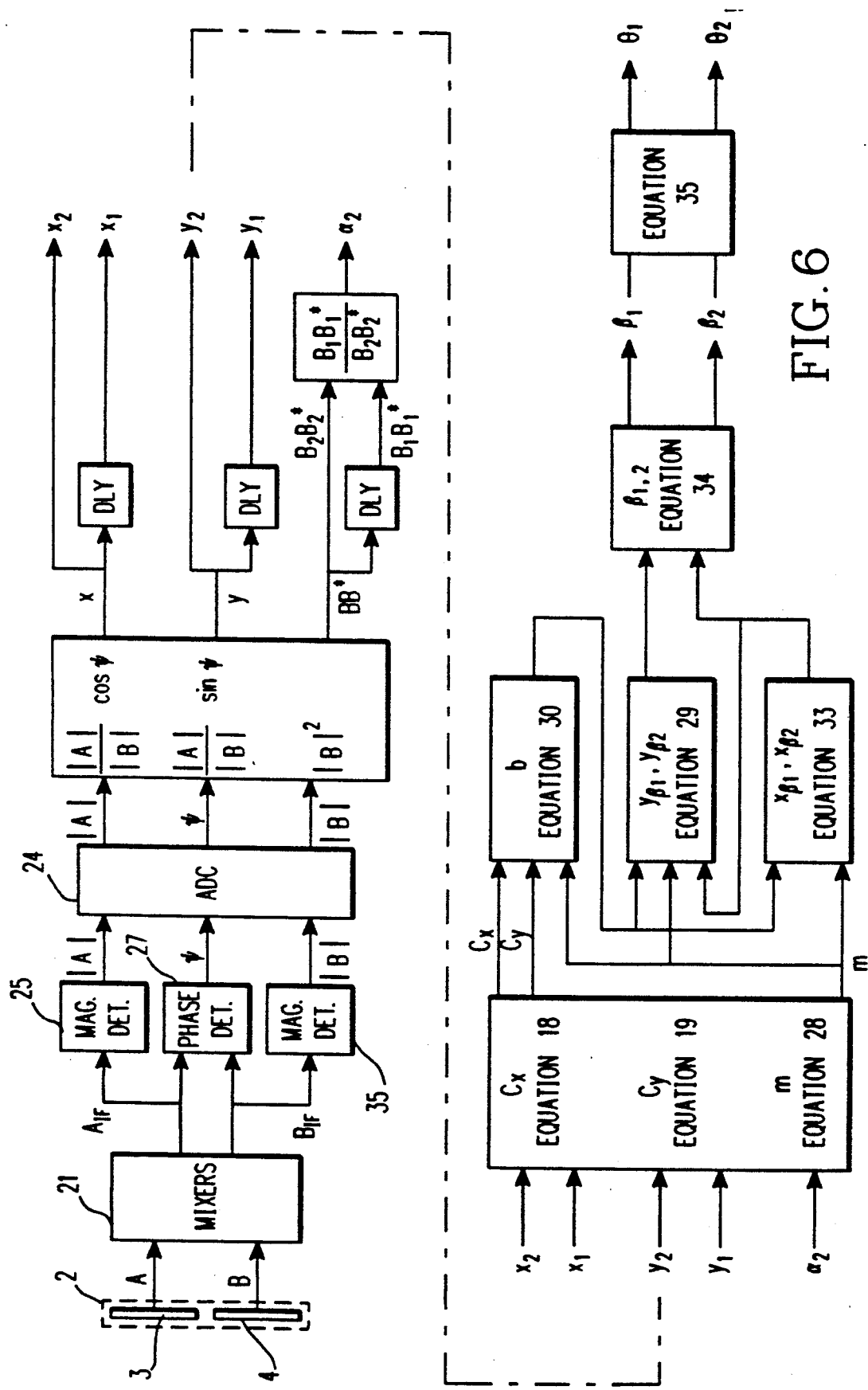
FIG. 6 is a block diagram illustrating the present preferred method of processing direct and multipath reflected signals utilizing the non-coherent radar hardware of FIG. 5.

Although the method of FIG. 4 shows a coherent radar, the complex indicated angle technique applies equally well to non-coherent, phase monopulse systems. FIGS. 5 and 6 are diagrams similar to FIGS. 3 and 4, but show a modified method and hardware to convert the outputs of a non-coherent radar into the x, y, and BB* signals which serve as the inputs to the complex indicated angle algorithm. The principal modification that is required is that the magnitudes of the individual channels be retained as well as the relative phase, $\psi$. In the embodiment of FIG. 5, signals A and B are received from portions 3 and 4 of array 2 and fed into mixers 21. The signals are mixed and analyzed in two magnitude detectors 25, 35 and phase detector 27. The absolute values of the signals |A| and |B| and the relative phase $\psi$ are digitized in A/D converter 24 and input into processing unit 26. A radar programmable signal processor or radar data processor of the type now in the art is suitable for this device. A second look is made to create signals $A_2$ and $B_2$ which are similarly processed. Then the processor finds $x_1$, $y_1$, and $B_1$ from signals A and B and finds $x_2$, $y_2$, and $B_2$ from signals $A_2$ and $B_2$. These values are further processed to yield $\alpha_2$, $\beta_1$ and $\beta_2$. From $\beta_1$ we can calculate $\theta_1$ using Equation 35. From $\beta_2$ we can calculate $\theta_2$ using the same equation. Normally only $\theta_1$ would be calculated. Once we know $\theta_1$ we can adjust our radar receiver or weapon to the path which originates at our receiver and extends at angle $\theta_1$ from the radar boresight.

Although I have described and illustrated certain present preferred embodiments of any method and apparatus it should be distinctly understood that the invention is not limited thereto but may be variously embodied within the scope of the following claims.

I claim:

1. A method for tracking at least one target with the aid of a computer and using an array having a first array portion which emits a signal A in response to radar waves striking the first array portion, and a second array portion which emits a signal B in response to radar waves striking the second array portion, and wherein a first set of radar waves strike the array at an angle $\theta_1$ relative to boresight and a second set of radar waves strike the array at an angle $\theta_2$ relative to boresight wherein one wishes to know at least one of angles $\theta_1$ and $\theta_2$ comprising the steps of:

a. providing a computer with a database for the method which includes:
   (i) a distance d between the first array portion and the second array portion;
   (ii) a wavelength $\lambda$ of the radar waves;
   (iii) a set of equations including:

$$\frac{A}{B} = \frac{|A|e^{j\beta_i}}{|B|} \text{ where } i = 1 \text{ or } 2$$

$$\beta_i = \frac{2\pi d}{\lambda}\sin\theta_i$$

$$\frac{A}{B} = \frac{e^{j\beta_1} + ae^{j\phi}e^{j\beta_2}}{1 + ae^{j\phi}}$$

where $ae^{j\phi}$ is a ratio of a return from the direct path to the return from the multipath:

$$x = Re\left(\frac{A}{B}\right) =$$

$$\frac{\cos\beta_1 + a^2\cos\beta_2 + 2a\cos[\frac{1}{2}(\beta_1 + \beta_2)]\cos[\frac{1}{2}(\beta_1 - \beta_2) - \phi]}{1 + 2a\cos\phi + a^2}$$

$$y = Im\left(\frac{A}{B}\right) =$$

$$\frac{\sin\beta_1 + a^2\sin\beta_2 + 2a\sin[\frac{1}{2}(\beta_1 + \beta_2)]\cos[\frac{1}{2}(\beta_1 - \beta_2) - \phi]}{1 + 2a\cos\phi + a^2}$$

wherein $\phi$ is a phase of the radar waves striking the array:

$$a^2 = \frac{|B_2|^2}{|B_1|^2} = \frac{1 + a^2 + 2a\cos\phi_2}{1 + a^2 + 2a\cos\phi_1}$$

where $B_1$ and $B_2$ are magnitudes of successive signals emitted from the second array portion and correspond to successive looks which correspond to positions $(x_1,y_1)$ and $(x_2,y_2)$ on a monopulse contour defined by $(x-C_x)^2+(y-C_y)^2=R^2$ $$m = -\frac{a^2 x_1 - x_2}{a^2 y_1 - y_2}$$

$$y = mx + b$$

$$C_x = \frac{\cos\beta_1 - a^2\cos\beta_2}{1 - a^2}$$

$$C_y = \frac{\sin\beta_1 - a^2\sin\beta_2}{1 - a^2}$$

$$b = C_y - mC_x$$

$$x_{\beta 1} = \frac{-mb}{m^2 + 1} + \frac{\sqrt{m^2 b^2 - (m^2 + 1)(b^2 - 1)}}{m^2 + 1}$$

-continued $$x_{\beta 2} = \frac{-mb}{m^2+1} + \frac{\sqrt{m^2b^2 - (m^2+1)(b^2-1)}}{m^2+1}$$

$$\beta_1 = \tan^{-1}\frac{y_{\beta 1}}{x_{\beta 1}}$$

$$\beta_2 = \tan^{-1}\frac{y_{\beta 2}}{x_{\beta 2}}$$

$$\theta_1 = \sin^{-1}\frac{\lambda\beta_1}{2\pi d}$$

$$\theta_2 = \sin^{-1}\frac{\lambda\beta_2}{2\pi d}$$

b. measuring first values of signals A and B, $A_1$ and $B_1$;

c. generating in the computer values for $x_1, y_1$ from the measured first values and the database;

d. measuring second values of signals A and B, $A_2$ and $B_2$;

e. generating in the computer values for $x_2, y_2$ from the measured second values and the database;

f. generating in the computer a value for $\theta_1$ for $x_1, y_1, x_2, y_2$ $$\frac{|B_1|^2}{|B_2|^2}$$

and the database; and g. adjusting one of a radar tracking unit and a weapon to an angle of $\theta_1$ from the boresight.

2. The method of claim 1 also comprising the step of generating in the computer a value for $\theta_2$.

3. The method of claim 1 wherein the first set of radar waves are reflected from a single target and travel a direct path from the single target to the array and the second set of radar waves are reflected from the same single target and travel a multipath during which they are reflected before striking the array.

4. The method of claim 1 wherein the first set of radar waves are reflected from a first target and travel a direct path from the first target to the array and the second set of radar waves are reflected from a second target and travel a direct path from the second target to the array.

5. An apparatus for tracking at least one target from a first set of reflected radar waves and a second set of reflected radar waves from coherent radar hardware comprising a. an array having a top portion and a bottom portion which receive reflected radar waves and generate signals in response thereto;

b. a linear coherent receiver connected to the array for receiving and coherently down-converting signals from the array;

c. an analog-to-digital converter connected to the linear coherent receiver;

d. memory containing a program for calculating electrical target angles $\beta_1$ and $\beta_2$ and at least one angle $\theta_1$ and $\theta_2$ between a radar boresight and a path of a reflected radar wave; and e. a processing unit connected to the memory and the analog-to-digital converter.

6. The apparatus of claim 5 wherein the first set of radar waves are reflected from a single target and travel a direct path from the single target to the array and the second set of radar waves are reflected from the same single target and travel a multipath during which they are reflected before striking the array.

7. The apparatus of claim 5 wherein the first set of radar waves are reflected from a first target and travel a direct path from the first target to the array and the second set of radar waves are reflected from a second target and travel a direct path from the second target to the array.

8. An apparatus for tracking at least one target from a first set of reflected radar waves and a second set of reflected radar waves from non-coherent radar hardware comprising:

a. an array having a top portion and a bottom portion which receive reflected radar waves and generate signals A and B in response thereto;

b. at least one signal mixer connected to the array which converts signals A and B into signals $A_{IF}$ and $B_{IF}$;

c. a phase detector which receives signals $A_{IF}$ and $B_{IF}$ and generates a phase value;

d. a first magnitude detector which receives signal $A_{IF}$ and converts it to a signal $|A|$;

e. a second magnitude detector which receives signal $B_{IF}$ and converts it to a signal $|B|$;

f. an analog-to-digital converter connected to the phase detector, first magnitude detector and second magnitude detector;

g. memory containing a program for calculating electrical target angles $\beta_1$ and $\beta_2$ and at least one angle $\theta_1$ and $\theta_2$ between a radar boresight and a path of a reflected radar signal; and h. a processing unit connected to the memory and the analog-to-digital converter.

9. The apparatus of claim 8 wherein the first set of radar waves are reflected from a single target and travel a direct path from the single target to the array and the second set of radar waves are reflected from the same single target and travel a multipath during which they are reflected before striking the array.

10. The apparatus of claim 8 wherein the first set of radar waves are reflected from a first target and travel a direct path from the first target to the array and the second set of radar waves are reflected from a second target and travel a direct path from the second target to the array.

* * * * *